US012594924B2

(12) United States Patent
Kalbasi et al.

(10) Patent No.: US 12,594,924 B2
(45) Date of Patent: Apr. 7, 2026

(54) VEHICLE BRAKE-BY-WIRE DIAGNOSTIC SYSTEM AND METHOD

(71) Applicant: GM Global Technology Operations LLC, Detroit, MI (US)

(72) Inventors: Hessam Kalbasi, Waterloo (CA); Mohammad Karimi, Pickering (CA); SeyedAlireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 18/653,181

(22) Filed: May 2, 2024

(65) Prior Publication Data

US 2025/0340195 A1     Nov. 6, 2025

(51) Int. Cl.
*B60T 17/22* (2006.01)

(52) U.S. Cl.
CPC ......... *B60T 17/22* (2013.01); *B60T 2270/406* (2013.01)

(58) Field of Classification Search
CPC ........................... B60T 17/22; B60T 2270/406
USPC ........................................ 701/33.9
See application file for complete search history.

(56) References Cited

U.S. PATENT DOCUMENTS 5,720,534 A * 2/1998 Stumpe .................... B60T 8/00
303/166
6,318,819 B1 * 11/2001 Bohm ................... B60T 17/221
303/20

2004/0193345 A1 * 9/2004 Chen ...................... B62D 6/003
180/443
2005/0001474 A1 * 1/2005 Zierolf .................... B60T 8/325
303/112
2013/0296130 A1 * 11/2013 Banker ..................... B60L 7/26
477/209
2013/0338896 A1 * 12/2013 Baehrle-Miller ....... B60T 7/045
701/70
2016/0020928 A1 * 1/2016 Ayichew ........... H04L 25/03261
701/70
2016/0176388 A1 * 6/2016 Baehrle-Miller ....... B60T 8/171
701/70
2017/0084941 A1 * 3/2017 Cai .................... H01M 8/04089
2018/0029583 A1 * 2/2018 Dieckmann ........... F16D 66/026
2018/0046182 A1 * 2/2018 Joyce ................. G01C 21/3453
2021/0402965 A1 * 12/2021 Shah ..................... G07C 5/085
2024/0367634 A1 * 11/2024 Vey ....................... B60T 13/662
2024/0400031 A1 * 12/2024 Diamond ............. B60T 17/221
2025/0313176 A1 * 10/2025 Park ....................... B60T 8/171

FOREIGN PATENT DOCUMENTS

DE          19526645 A1     1/1997

* cited by examiner

*Primary Examiner* — Krishnan Ramesh
(74) *Attorney, Agent, or Firm* — Vivacqua Crane, PLLC

(57)          ABSTRACT

A method for diagnostic monitoring of a vehicle brake-by-wire system for a vehicle may include recording a reference excitation profile of a reference brake-by-wire unit. The method further may include identifying one or more characteristic functions of the reference brake-by-wire unit based at least in part on the reference excitation profile. The method further may include determining a performance of a vehicle brake-by-wire unit based at least in part on the one or more characteristic functions. The method further may include performing a diagnostic action based at least in part on the performance of the vehicle brake-by-wire unit.

20 Claims, 4 Drawing Sheets

100

500

104

VEHICLE BRAKE-BY-WIRE DIAGNOSTIC SYSTEM AND METHOD

INTRODUCTION

The present disclosure relates to systems and methods for diagnostics for a vehicle, and more particularly, to systems and methods for diagnostic monitoring of vehicle brake-by-wire systems.

To increase vehicle performance and reliability, vehicles may be equipped with diagnostic systems which are configured to monitor, test, troubleshoot, and/or diagnose other vehicle systems. Diagnostic systems may track faults, errors, and/or additional diagnostic information and provide information to vehicle occupants and/or service technicians. For example, the diagnostic system may monitor data such as brake force and stopping distance in order to identify faults or errors in the operation of vehicle braking system. Increasingly, vehicle systems are electro-mechanical in nature, meaning that mechanical components are controlled by electronic sensors, actuators, and control systems. For example, vehicle brake-by-wire systems including electro-mechanical brakes (EMB) and/or electro-hydraulic brakes (EHB) are complex and critical electro-mechanical systems including both electrical and mechanical components. Current diagnostic systems may not account for the ability of electronic vehicle systems to compensate for mechanical faults, thereby allowing mechanical faults to go undetected.

Thus, while current diagnostic systems and methods achieve their intended purpose, there is a need for a new and improved system and method for diagnostic monitoring of vehicle brake-by-wire systems.

SUMMARY

According to several aspects, a method for diagnostic monitoring of a vehicle brake-by-wire system for a vehicle is provided. The method may include recording a reference excitation profile of a reference brake-by-wire unit. The method further may include identifying one or more characteristic functions of the reference brake-by-wire unit based at least in part on the reference excitation profile. The method further may include determining a performance of a vehicle brake-by-wire unit based at least in part on the one or more characteristic functions. The method further may include performing a diagnostic action based at least in part on the performance of the vehicle brake-by-wire unit.

In another aspect of the present disclosure, recording the reference excitation profile of the reference brake-by-wire unit further may include recording the reference excitation profile of the reference brake-by-wire unit. The reference brake-by-wire unit is a known healthy brake-by-wire unit. The reference excitation profile includes a requested clamp force versus time, a corresponding requested actuator displacement versus time, and a measured clamp force versus time.

In another aspect of the present disclosure, identifying the one or more characteristic functions further may include determining an end-to-end characteristic transfer function based at least in part on the requested clamp force versus time and the measured clamp force versus time. Identifying the one or more characteristic functions further may include determining a mechanical characteristic function based at least in part on the requested actuator displacement versus time and the measured clamp force versus time.

In another aspect of the present disclosure, determining the end-to-end characteristic transfer function further may include determining a general form of the end-to-end characteristic transfer function. The general form of the end-to-end characteristic transfer function models nominal overall system dynamics of the vehicle brake-by-wire unit. The general form of the end-to-end characteristic transfer function is characterized by a plurality of end-to-end system parameters. Determining the end-to-end characteristic transfer function further may include estimating a value for each of the plurality of end-to-end system parameters based at least in part on the requested clamp force versus time and the measured clamp force versus time.

In another aspect of the present disclosure, determining the general form of the end-to-end characteristic transfer function further may include determining the general form of the end-to-end characteristic transfer function to be a rational fractional polynomial:

$$H_{end-end} = \frac{b_0 s^m + b_1 s^{m-1} + \cdots + b_m}{s^n + a_1 s^{n-1} + \cdots a_n} \cdot e^{-T_d s}$$

where $H_{end-end}$ is the end-to-end characteristic transfer function, s is a complex frequency variable, and the m, n, b, a, and $T_d$ factors are the plurality of end-to-end system parameters.

In another aspect of the present disclosure, estimating the value for each of the plurality of end-to-end system parameters further may include estimating a preliminary value for each of the plurality of end-to-end system parameters using a least-squares regression based at least in part on the requested clamp force versus time and the measured clamp force versus time. Estimating the value for each of the plurality of end-to-end system parameters further may include estimating the value for each of the plurality of end-to-end system parameters using a nonlinear optimization based at least in part on the preliminary value for each of the plurality of end-to-end system parameters, the requested clamp force versus time, and the measured clamp force versus time.

In another aspect of the present disclosure, determining the mechanical characteristic function further may include determining a general form of the mechanical characteristic function. The general form of the mechanical characteristic function models nominal mechanical dynamics of the vehicle brake-by-wire unit. The general form of the mechanical characteristic function is a third-order polynomial. The general form of the mechanical characteristic function is characterized by a plurality of mechanical system parameters. Determining the mechanical characteristic function further may include estimating a value for each of the plurality of mechanical system parameters based at least in part on the requested actuator displacement versus time and the measured clamp force versus time.

In another aspect of the present disclosure, estimating the value for each of the plurality of mechanical system parameters further may include estimating the value for each of the plurality of mechanical system parameters using a nonlinear least-squares regression based at least in part on the requested actuator displacement versus time and the measured clamp force versus time.

In another aspect of the present disclosure, determining the performance of the vehicle brake-by-wire unit further may include determining a first expected clamp force based at least in part on a requested clamp force value and the end-to-end characteristic transfer function. Determining the performance of the vehicle brake-by-wire unit further may include determining a second expected clamp force based at least in part on an actuator displacement value and the mechanical characteristic function. Determining the performance of the vehicle brake-by-wire unit further may include determining a first clamp force deviation between the first expected clamp force and a measured clamp force value. Determining the performance of the vehicle brake-by-wire unit further may include determining a second clamp force deviation between the second expected clamp force and the measured clamp force value. Determining the performance of the vehicle brake-by-wire unit further may include determining the performance of the vehicle brake-by-wire unit based at least in part on the first clamp force deviation and the second clamp force deviation.

In another aspect of the present disclosure, performing the diagnostic action further may include incrementing an end-to-end diagnostic maturation counter in response to determining that a magnitude of the first clamp force deviation is greater than or equal to a first predetermined threshold. Performing the diagnostic action further may include incrementing a mechanical diagnostic maturation counter in response to determining that a magnitude of the second clamp force deviation is greater than or equal to a second predetermined threshold. Performing the diagnostic action further may include comparing the end-to-end diagnostic maturation counter to an end-to-end maturation threshold. Performing the diagnostic action further may include comparing the mechanical diagnostic maturation counter to a mechanical maturation threshold. The mechanical maturation threshold is less than the end-to-end maturation threshold. Performing the diagnostic action further may include providing a diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold.

According to several aspects, a vehicle brake-by-wire diagnostic system is provided. The vehicle brake-by-wire diagnostic system may include a vehicle brake-by-wire unit having a vehicle brake clamp force sensor. The vehicle brake-by-wire diagnostic system further may include a vehicle controller in electrical communication with the vehicle brake-by-wire unit. The vehicle controller is programmed to determine a first expected clamp force based at least in part on a requested clamp force value and an end-to-end characteristic transfer function. The end-to-end characteristic transfer function models nominal overall system dynamics of the vehicle brake-by-wire unit. The vehicle controller is further programmed to determine a second expected clamp force based at least in part on an actuator displacement value and a mechanical characteristic function. The mechanical characteristic function models nominal mechanical dynamics of the vehicle brake-by-wire unit. The vehicle controller is further programmed to determine a first clamp force deviation between the first expected clamp force and a measured clamp force value measured by the vehicle brake clamp force sensor. The vehicle controller is further programmed to determine a second clamp force deviation between the second expected clamp force and the measured clamp force value measured by the vehicle brake clamp force sensor. The vehicle controller is further programmed to determine a performance of the vehicle brake-by-wire unit based at least in part on the first clamp force deviation and the second clamp force deviation. The vehicle controller is further programmed to perform a diagnostic action based at least in part on the performance of the vehicle brake-by-wire unit.

In another aspect of the present disclosure, the vehicle brake-by-wire diagnostic system further includes a reference brake-by-wire unit having a reference brake clamp force sensor and a reference brake actuator displacement sensor. The vehicle brake-by-wire diagnostic system further includes a reference controller in electrical communication with the reference brake-by-wire unit. The reference controller is programmed to record a reference excitation profile of the reference brake-by-wire unit. The reference brake-by-wire unit is a known healthy brake-by-wire unit. The reference excitation profile includes a requested clamp force versus time, a corresponding requested actuator displacement versus time, and a measured clamp force versus time. The reference controller is further programmed to determine the end-to-end characteristic transfer function based at least in part on the requested clamp force versus time and the measured clamp force versus time. The reference controller is further programmed to determine the mechanical characteristic function based at least in part on the requested actuator displacement versus time and the measured clamp force versus time.

In another aspect of the present disclosure, to determine the end-to-end characteristic transfer function, the reference controller is further programmed to determine a general form of the end-to-end characteristic transfer function to be a rational fractional polynomial;

$$H_{end-end} = \frac{b_0 s^m + b_1 s^{m-1} + \cdots + b_m}{s^n + a_1 s^{n-1} + \cdots a_n} \cdot e^{-T_d s}$$

where $H_{end-end}$ is the end-to-end characteristic transfer function, s is a complex frequency variable, and the m, n, b, a, and $T_d$ factors are a plurality of end-to-end system parameters, and wherein the general form of the end-to-end characteristic transfer function models nominal overall system dynamics of the vehicle brake-by-wire unit. To determine the end-to-end characteristic transfer function, the reference controller is further programmed to estimate a value for each of the plurality of end-to-end system parameters based at least in part on the requested clamp force versus time and the measured clamp force versus time.

In another aspect of the present disclosure, to estimate the value for each of the plurality of end-to-end system parameters, the reference controller is further programmed to estimate a preliminary value for each of the plurality of end-to-end system parameters using a least-squares regression based at least in part on the requested clamp force versus time and the measured clamp force versus time. To estimate the value for each of the plurality of end-to-end system parameters, the reference controller is further programmed to estimate the value for each of the plurality of end-to-end system parameters using a nonlinear optimization based at least in part on the preliminary value for each of the plurality of end-to-end system parameters, the requested clamp force versus time, and the measured clamp force versus time.

In another aspect of the present disclosure, to determine the mechanical characteristic function, the reference controller is further programmed to determine a general form of the mechanical characteristic function. The general form of the mechanical characteristic function models nominal mechanical dynamics of the vehicle brake-by-wire unit. The general form of the mechanical characteristic function is a third-order polynomial. The general form of the mechanical characteristic function is characterized by a plurality of mechanical system parameters. To determine the mechanical characteristic function, the reference controller is further programmed to estimate a value for each of the plurality of mechanical system parameters based at least in part on the requested actuator displacement versus time and the measured clamp force versus time.

In another aspect of the present disclosure, to estimate the value for each of the plurality of mechanical system parameters, the reference controller is further programmed to estimate the value for each of the plurality of mechanical system parameters using a nonlinear least-squares regression based at least in part on the requested actuator displacement versus time and the measured clamp force versus time.

In another aspect of the present disclosure, to perform the diagnostic action, the vehicle controller is further programmed to increment an end-to-end diagnostic maturation counter in response to determining that a magnitude of the first clamp force deviation is greater than or equal to a first predetermined threshold. To perform the diagnostic action, the vehicle controller is further programmed to increment a mechanical diagnostic maturation counter in response to determining that a magnitude of the second clamp force deviation is greater than or equal to a second predetermined threshold. To perform the diagnostic action, the vehicle controller is further programmed to compare the end-to-end diagnostic maturation counter to an end-to-end maturation threshold. To perform the diagnostic action, the vehicle controller is further programmed to compare the mechanical diagnostic maturation counter to a mechanical maturation threshold. The mechanical maturation threshold is less than the end-to-end maturation threshold. To perform the diagnostic action, the vehicle controller is further programmed to provide a diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold.

According to several aspects, a method for diagnostic monitoring of a vehicle brake-by-wire system is provided. The method may include recording a reference excitation profile of a reference brake-by-wire unit. The reference brake-by-wire unit is a known healthy brake-by-wire unit. The reference excitation profile includes a requested clamp force versus time, a corresponding requested actuator displacement versus time, and a measured clamp force versus time. The method further may include determining an end-to-end characteristic transfer function based at least in part on the requested clamp force versus time and the measured clamp force versus time. The method further may include determining a mechanical characteristic function based at least in part on the requested actuator displacement versus time and the measured clamp force versus time. The method further may include determining a performance of a vehicle brake-by-wire unit based on the end-to-end characteristic transfer function and the mechanical characteristic function. The method further may include performing a diagnostic action based at least in part on the performance of the vehicle brake-by-wire unit.

In another aspect of the present disclosure, determining the end-to-end characteristic transfer function and the mechanical characteristic function further may include determining a general form of the end-to-end characteristic transfer function to be a rational fractional polynomial:

$$H_{end-end} = \frac{b_0 s^m + b_1 s^{m-1} + \cdots + b_m}{s^n + a_1 s^{n-1} + \cdots a_n} \cdot e^{-T_d s}$$

where $H_{end-end}$ is the end-to-end characteristic transfer function, s is a complex frequency variable, and the m, n, b, a, and $T_d$ factors are a plurality of end-to-end system parameters. Determining the end-to-end characteristic transfer function and the mechanical characteristic function further may include estimating a value for each of the plurality of end-to-end system parameters based at least in part on the requested clamp force versus time and the measured clamp force versus time. Determining the end-to-end characteristic transfer function and the mechanical characteristic function further may include determining a general form of the mechanical characteristic function. The general form of the mechanical characteristic function models nominal mechanical dynamics of the vehicle brake-by-wire unit. The general form of the mechanical characteristic function is a third-order polynomial. The general form of the mechanical characteristic function is characterized by a plurality of mechanical system parameters. Determining the end-to-end characteristic transfer function and the mechanical characteristic function further may include estimating a value for each of the plurality of mechanical system parameters based at least in part on the requested actuator displacement versus time and the measured clamp force versus time.

In another aspect of the present disclosure, determining the performance of the vehicle brake-by-wire unit and performing the diagnostic action further may include determining a first expected clamp force based at least in part on a requested clamp force value and the end-to-end characteristic transfer function. Determining the performance of the vehicle brake-by-wire unit and performing the diagnostic action further may include determining a second expected clamp force based at least in part on an actuator displacement value and the mechanical characteristic function. Determining the performance of the vehicle brake-by-wire unit and performing the diagnostic action further may include determining a first clamp force deviation between the first expected clamp force and a measured clamp force value. Determining the performance of the vehicle brake-by-wire unit and performing the diagnostic action further may include determining a second clamp force deviation between the second expected clamp force and the measured clamp force value. Determining the performance of the vehicle brake-by-wire unit and performing the diagnostic action further may include determining the performance of the vehicle brake-by-wire unit based at least in part on the first clamp force deviation and the second clamp force deviation. Determining the performance of the vehicle brake-by-wire unit and performing the diagnostic action further may include incrementing an end-to-end diagnostic maturation counter in response to determining that a magnitude of the first clamp force deviation is greater than or equal to a first predetermined threshold. Determining the performance of the vehicle brake-by-wire unit and performing the diagnostic action further may include incrementing a mechanical diagnostic maturation counter in response to determining that a magnitude of the second clamp force deviation is greater than or equal to a second predetermined threshold. Determining the performance of the vehicle brake-by-wire unit and performing the diagnostic action further may include comparing the end-to-end diagnostic maturation counter to an end-to-end maturation threshold. Determining the performance of the vehicle brake-by-wire unit and performing the diagnostic action further may include comparing the mechanical diagnostic maturation counter to a mechanical maturation threshold. The mechanical maturation threshold is less than the end-to-end maturation threshold. Determining the performance of the vehicle brake-by-wire unit and performing the diagnostic action further may include providing a diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, vehicle brake-by-wire systems including electro-mechanical brakes (EMB) and/or electro-hydraulic brakes (EHB) are complex and critical electro-mechanical systems. Therefore, diagnostics for identification of faults is advantageous. Current diagnostic systems may not account for the ability of electronic vehicle systems to compensate for mechanical faults, thereby allowing mechanical faults to go undetected. Accordingly, the present disclosure provides a new and improved system and method for diagnostic monitoring of a vehicle brake-by-wire system.

Figures 1, 2:
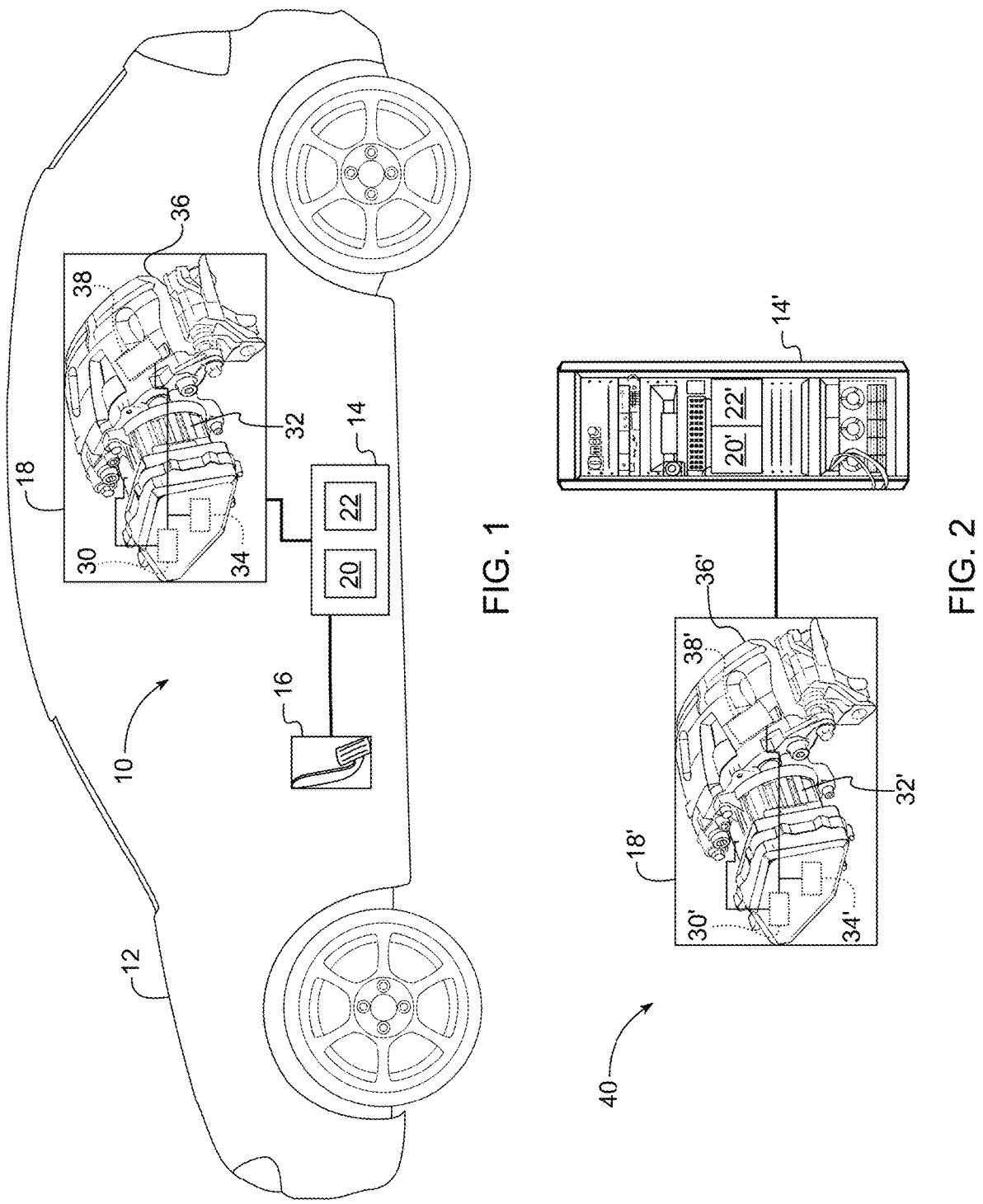
FIG. 1 is a schematic diagram of a vehicle brake-by-wire diagnostic system, according to an exemplary embodiment.
FIG. 2 is a schematic diagram of a reference calibration system, according to an exemplary embodiment.

Referring to FIG. 1, a vehicle brake-by-wire diagnostic system is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a brake input device 16, and a vehicle brake-by-wire unit 18. While a single vehicle brake-by-wire unit 18 is shown in FIG. 1 and discussed in the following disclosure, it should be understood that the system 10 may include multiple brake-by-wire units (e.g., one disposed at each wheel of the vehicle 12) without departing from the scope of the present disclosure.

The vehicle controller 14 is used to implement a method 100 for diagnostic monitoring of a vehicle brake-by-wire system, as will be described below. The vehicle controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12.

The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the brake input device 16 and the vehicle brake-by-wire unit 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure. It should further be understood that, in the scope of the present disclosure, electrical communication also includes power and/or energy transfer between electrical devices (e.g., using conducting wires and/or wireless power transmission techniques).

The brake input device 16 is used to receive a braking request. In the scope of the present disclosure, a braking request is a command from an occupant and/or software module of the vehicle 12 to decelerate or brake the vehicle 12. In a non-limiting example, the braking request includes one or more parameters, including a requested deceleration rate of the vehicle 12. In an exemplary embodiment, the brake input device 16 includes a brake pedal and a brake pedal position sensor. When an occupant of the vehicle 12 actuates the brake pedal, the brake pedal position sensor measures a position of the brake pedal and provides the position of the brake pedal to the vehicle controller 14. In a non-limiting example, the requested deceleration rate of the vehicle 12 is proportional to the position of the brake pedal.

In a non-limiting example, the brake pedal position sensor includes a potentiometer having at least a first terminal electrically connected to a wiper and a second terminal. The wiper of the potentiometer is affixed (e.g., by way of a mechanical linkage, a gearset, and/or the like) to the brake pedal. Therefore, an electrical resistance measured between the first terminal (i.e., the wiper) and the second terminal is proportional to the position of the brake pedal. Accordingly, by measuring the electrical resistance between the first terminal and the second terminal of the potentiometer, the vehicle controller 14 determines the position of the brake pedal. It should be understood that additional sensors for measuring the position of the brake pedal (e.g., rotary encoders, proximity sensors, and the like) are within the scope of the present disclosure.

In another exemplary embodiment, the brake input device 16 includes an advanced driver assistance system (ADAS) and/or an automated driving system (ADS). In a non-limiting example, the ADAS and/or ADS is a hardware and/or software module of the vehicle 12 and/or the vehicle controller 14. The ADAS and/or ADS is configured to detect and/or receive information about an environment surrounding the vehicle 12 and process the information to generate control inputs (i.e., acceleration commands, steering commands, brake commands, and/or the like) for the vehicle 12. Therefore, in some embodiments, braking requests including the requested deceleration rate of the vehicle 12 are electrically communicated to the brake input device 16 from an ADAS and/or ADS of the vehicle 12. It should be understood that the brake input device 16 includes any device configured to receive physical and/or electrical inputs requesting deceleration or braking of the vehicle 12.

The brake input device 16 is in electrical communication with the vehicle controller 14. Based on the braking request including the requested deceleration rate of the vehicle 12 received from the brake input device 16, the vehicle controller 14 determines a requested clamp force value. In the scope of the present disclosure the requested clamp force value is a clamp force which must be exerted by the vehicle brake-by-wire unit 18 in order to fulfill the braking request and provide the requested deceleration rate of the vehicle 12. In a non-limiting example, the requested clamp force value is determined based on the requested deceleration rate, a weight of the vehicle 12, a performance capability of the vehicle brake-by-wire unit 18, and/or the like. The vehicle controller 14 then transmits the requested clamp force value to the vehicle brake-by-wire unit 18, as will be discussed in greater detail below.

The vehicle brake-by-wire unit 18 is used to provide braking force for the vehicle 12. In an exemplary embodiment, the vehicle brake-by-wire unit 18 is an electro-mechanical brake (EMB) or an electro-hydraulic brake (EHB). The vehicle brake-by-wire unit 18 includes a vehicle brake actuator control unit 30, a vehicle brake actuator unit 32, vehicle brake actuator displacement sensor 34, a vehicle braking unit 36, and a vehicle brake clamp force sensor 38.

The vehicle brake actuator control unit 30 receives the requested clamp force value from the vehicle controller 14 and determines a requested actuator displacement of the vehicle brake actuator unit 32 necessary to provide the requested clamp force value. In an exemplary embodiment, the vehicle brake actuator control unit 30 is similar in structure and function to the vehicle controller 14 discussed above. Therefore, the vehicle brake actuator control unit 30 includes one or more processors, microprocessors, field-programmable gate arrays (FPGA), and/or the like capable of executing program instructions stored in a non-volatile memory.

In an exemplary embodiment, the processor of the vehicle brake actuator control unit 30 executes a closed-loop control routine to determine and/or update the requested actuator displacement value based on inputs from the vehicle brake actuator displacement sensor 34 and the vehicle brake clamp force sensor 38. In a non-limiting example, the relationship between the requested clamp force value and the requested actuator displacement value is based at least in part on design variables (e.g., gear ratios, lead screw pitches, and/or the like) of the vehicle brake actuator unit 32 and the vehicle braking unit 36. The vehicle brake actuator control unit 30 is in electrical communication with the vehicle controller 14.

The vehicle brake actuator unit 32 is used to exert force on the vehicle braking unit 36 in order to effectuate the clamp force. In the case of an electro-mechanical brake (EMB), the vehicle brake actuator unit 32 includes an electric motor which directly applies force to the vehicle braking unit 36. In the case of an electro-hydraulic brake (EHB), the vehicle brake actuator unit 32 includes an electric motor which acts as a hydraulic pump to pressurize a hydraulic fluid which applies force to the vehicle braking unit 36. In an exemplary embodiment, the requested actuator displacement value is a number of rotations, a number of degrees of rotation and/or the like of the electric motor of the vehicle brake actuator unit 32 which are necessary to induce the requested clamp force in the vehicle braking unit 36. The vehicle brake actuator unit 32 is in electrical communication with, and is controlled by, the vehicle brake actuator control unit 30.

The vehicle brake actuator displacement sensor 34 is used to measure actual actuator displacement of the vehicle brake actuator unit 32. In an exemplary embodiment, the vehicle brake actuator displacement sensor 34 includes a rotary encoder, hall-effect sensor, and/or additional electrical components configured to measure the amount of rotation (i.e., displacement) of the electric motor of the vehicle brake actuator unit 32. In a non-limiting example, the vehicle brake actuator displacement sensor 34 is disposed on a shaft of the electric motor of the vehicle brake actuator unit 32. The vehicle brake actuator displacement sensor 34 is in electrical communication with the vehicle brake actuator control unit 30 and the vehicle controller 14.

The vehicle braking unit 36 is used to translate rotational or hydraulic force provided by the vehicle brake actuator unit 32 into clamp force to provide braking for the vehicle 12. In an exemplary embodiment, the vehicle braking unit 36 is a brake caliper configured to apply clamp force to brake pads which provide mechanical friction on a brake rotor or drum to decelerate the vehicle 12. In a non-limiting example, the brake caliper includes a housing, pistons, and brake pads. The housing of the brake caliper encloses the pistons and provides a structure to mount the caliper to the vehicle 12. The pistons are typically located inside the housing and can move in a linear motion. When the vehicle brake actuator unit 32 provides rotational force or hydraulic force, the pistons extend outward, applying the clamp force on the brake rotor or drum via the brake pads. Friction between the brake pads and the brake rotor or drum generates the necessary stopping force to achieve the requested deceleration rate of the vehicle 12.

The vehicle brake clamp force sensor 38 is used to measure a measured clamp force value applied by the vehicle braking unit 36. In an exemplary embodiment, the vehicle brake clamp force sensor 38 includes a strain gauge element disposed between components of the vehicle braking unit 36 (e.g., disposed between the pistons and the brake pads, between the pistons and the housing, and/or the like). The strain gauge element deforms in response to applied force, causing a change in electrical resistance. The measured clamp force value is determined based on the change in electrical resistance of the strain gauge element. The vehicle brake clamp force sensor 38 is in electrical communication with the vehicle brake actuator control unit 30 and the vehicle controller 14.

Referring to FIG. 2, a reference calibration system 40 is shown. As will be discussed in greater detail below, the reference calibration system 40 is used to determine calibration parameters used by the vehicle controller 14 for diagnostic monitoring of the vehicle brake-by-wire system 10. The reference calibration system 40 includes a reference controller 14' and a reference brake-by-wire unit 18'.

The reference controller 14' is used in conjunction with the vehicle controller 14 to implement the method 100 for diagnostic monitoring of the vehicle brake-by-wire system 10, as will be described below. The reference controller 14' includes at least one reference processor 20' and a reference non-transitory computer readable storage device or reference media 22'. The description of the type and configuration given above for the vehicle controller 14 also applies to the reference controller 14'. In some examples, the reference controller 14' may differ from the vehicle controller 14 in that the reference controller 14' is capable of a higher processing speed, includes more memory, includes more inputs/outputs, and/or the like. In a non-limiting example, the reference processor 20' and reference media 22' of the reference controller 14' are similar in structure and/or function to the processor 20 and the media 22 of the vehicle controller 14, as described above.

The reference brake-by-wire unit 18' includes a reference brake actuator control unit 30', a reference brake actuator unit 32', reference brake actuator displacement sensor 34', a reference braking unit 36', and a reference brake clamp force sensor 38'. The description of the type and configuration given above for the vehicle brake-by-wire unit 18 also applies to the reference brake-by-wire unit 18', except that the reference brake-by-wire unit 18' is a known healthy brake-by-wire unit. In the scope of the present disclosure, "known healthy" means that the reference brake-by-wire unit 18' is known to be operating nominally within manufacturer specifications, does not have any degradation, damage, or wear, and does not exhibit any abnormal or unexpected functionality.

Therefore, the reference brake actuator control unit 30' is similar in structure and/or function to the vehicle brake actuator control unit 30 described above, except that the reference brake actuator control unit 30' is a known healthy brake actuator control unit. The reference brake actuator unit 32' is similar in structure and/or function to the vehicle brake actuator unit 32 described above, except that the reference brake actuator unit 32' is a known healthy brake actuator unit. The reference brake actuator displacement sensor 34' is similar in structure and/or function to the vehicle brake actuator displacement sensor 34 described above, except that the reference brake actuator displacement sensor 34' is a known healthy brake actuator displacement sensor. The reference braking unit 36' is similar in structure and/or function to the vehicle braking unit 36 described above, except that the reference braking unit 36' is a known healthy braking unit. The reference brake clamp force sensor 38' is similar in structure and/or function to the vehicle brake clamp force sensor 38 described above, except that the reference brake clamp force sensor 38' is a known healthy brake clamp force sensor.

The reference brake-by-wire unit 18' is in electrical communication with the reference controller 14' as described above. In an exemplary embodiment, the reference controller 14' controls the reference brake-by-wire unit 18' in order to gather data used to determine calibration parameters used by the vehicle controller 14 for diagnostic monitoring of the vehicle brake-by-wire system 10, as will be discussed in greater detail below.

Figure 3:
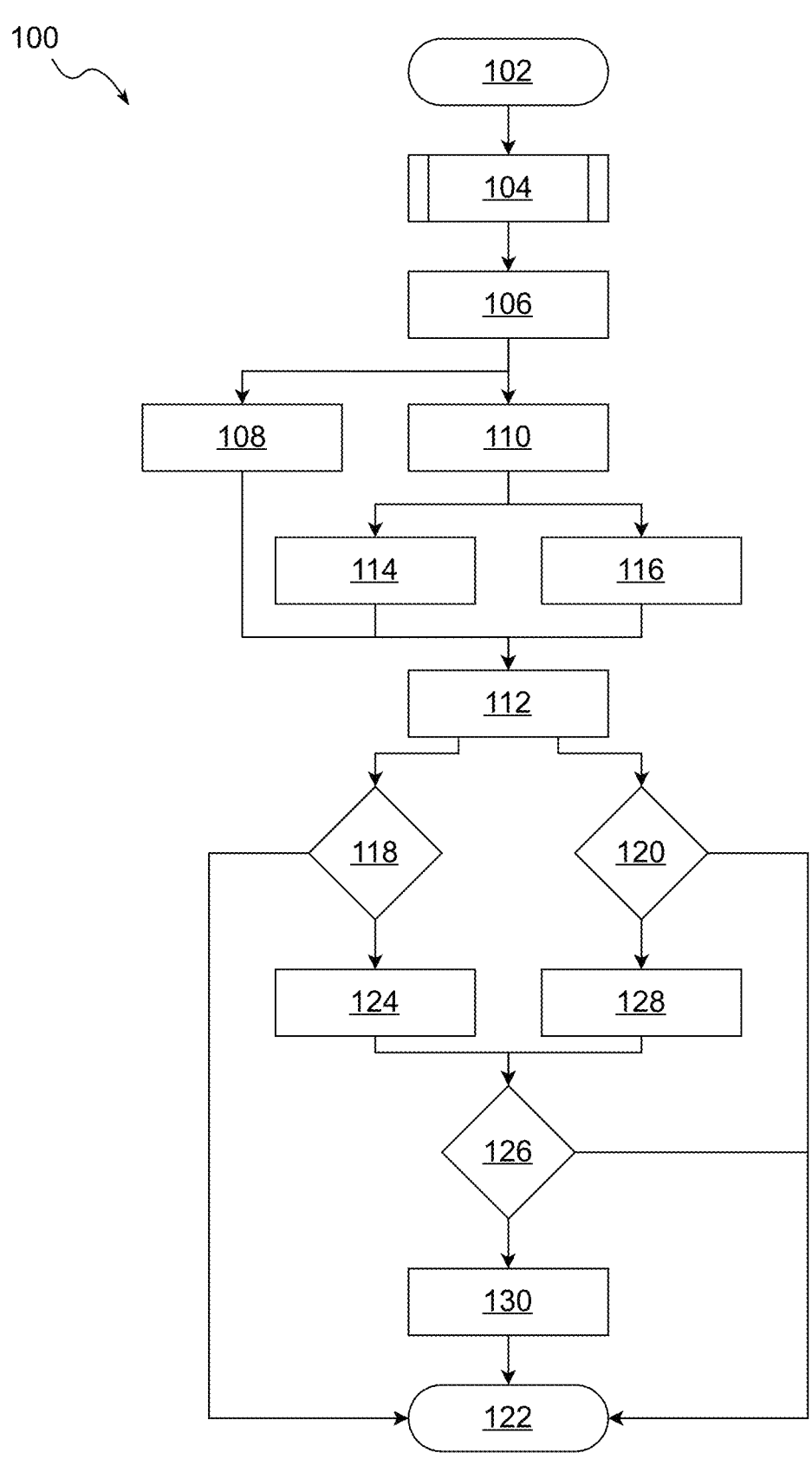
FIG. 3 is a flowchart of a method for diagnostic monitoring of a vehicle brake-by-wire system according, to an exemplary embodiment.

Referring to FIG. 3, a flowchart of the method 100 for diagnostic monitoring of a vehicle brake-by-wire system is shown. The method 100 begins at block 102 and proceeds to block 104. At block 104, the reference controller 14' determines characteristic functions 50 (FIG. 4) which model nominal overall system dynamics of the vehicle brake-by-wire unit 18 when the vehicle brake-by-wire unit 18 is operating nominally (i.e., when the vehicle brake-by-wire unit 18 is "healthy").

Figure 4:
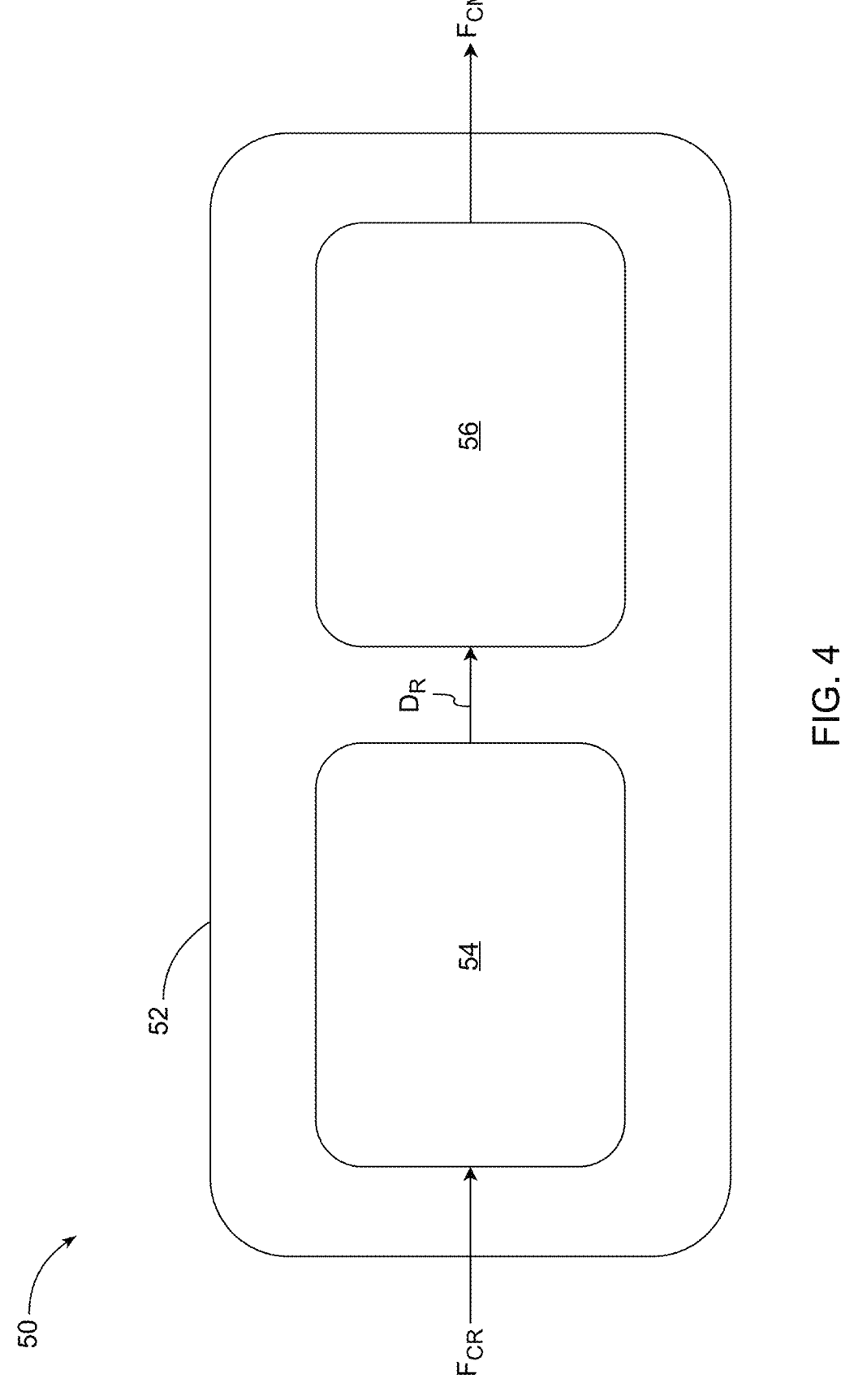
FIG. 4 is a schematic diagram depicting characteristic functions of a vehicle brake-by-wire unit, according to an exemplary embodiment.

Referring to FIG. 4, a schematic diagram depicting the characteristic functions 50 of the vehicle brake-by-wire unit 18 is shown. The vehicle brake-by-wire unit 18 is configured to receive the requested clamp force value FOR as input and provide the measured clamp force value FCM to decelerate the vehicle 12, as discussed above. Therefore, an end-to-end characteristic transfer function 52 which models nominal overall system dynamics of the vehicle brake-by-wire unit 18 is defined as:

$$H_{end-end} = \frac{F_{CM}}{F_{CR}} \tag{1}$$

where $H_{end-end}$ is the end-to-end characteristic transfer function 52, $F_{CR}$ is the requested clamp force value, and $F_{CM}$ is the measured clamp force value. It should be understood that the end-to-end characteristic transfer function 52 may be arbitrarily complex, and may include, for example, one or more feedback/closed-loop control routines without departing from the scope of the present disclosure.

In an exemplary embodiment, the end-to-end characteristic transfer function 52 includes at least an electrical characteristic transfer function 54 and a mechanical characteristic function 56. The electrical characteristic transfer function 54 models nominal electrical, sensing, and control system dynamics of interactions between the vehicle brake actuator control unit 30, the vehicle brake actuator displacement sensor 34, and the vehicle brake clamp force sensor 38. In a non-limiting example, the electrical characteristic transfer function 54 is defined as:

$$H_{elec} = \frac{D_R}{F_{CR}} \tag{2}$$

where $H_{elec}$ is the electrical characteristic transfer function 54, $F_{CR}$ is the requested clamp force value, and $D_R$ is the requested actuator displacement value. It should be understood that the electrical characteristic transfer function 54 may be arbitrarily complex, and may include, for example, one or more feedback/closed-loop control routines without departing from the scope of the present disclosure.

The mechanical characteristic function 56 models nominal mechanical dynamics of the vehicle brake-by-wire unit 18, for example, mechanical interactions between the vehicle brake actuator unit 32, the vehicle braking unit 36, and the brake rotor/drum of the vehicle 12. In a non-limiting example, the mechanical characteristic function 56 is a nonlinear function which defines the measured clamp force value $F_{CM}$ in terms of the requested actuator displacement value $D_R$. Thus, the mechanical characteristic function 56 receives the requested actuator displacement value $D_R$ as an input and provides the measured clamp force value $F_{CM}$ as an output. It should be understood that the mechanical characteristic function 56 may be arbitrarily complex without departing from the scope of the present disclosure.

Referring again to FIG. 3, the end-to-end characteristic transfer function 52 and the mechanical characteristic function 56 are determined using the reference calibration system 40 based on testing of the reference brake-by-wire unit 18', as will be discussed in greater detail below. After block 104, the method 100 proceeds to block 106.

At block 106, the vehicle controller 14 determines the requested clamp force value based on input from the brake input device 16 as discussed above. After block 106, the method 100 proceeds to blocks 108 and 110.

At block 108, the vehicle controller 14 determines a first expected clamp force. In the scope of the present disclosure, an expected clamp force is a clamp force predicted by the characteristic functions 50 of the vehicle brake-by-wire unit 18 based on the requested clamp force value determined at block 106. The first expected clamp force is determined using the end-to-end characteristic transfer function 52. In an exemplary embodiment, to determine the first expected clamp force, the vehicle controller 14 multiplies the requested clamp force value determined at block 106 by the end-to-end characteristic transfer function 52 to calculate the first expected clamp force. After block 108, the method 100 proceeds to block 112, as will be discussed in greater detail below.

At block 110, the vehicle controller 14 sends the requested clamp force value determined at block 106 to the vehicle brake actuator control unit 30 of the vehicle brake-by-wire unit 18. The vehicle brake actuator control unit 30 determines the requested actuator displacement of the vehicle brake actuator unit 32 necessary to provide the requested clamp force value, as discussed above. After block 110, the method 100 proceeds to blocks 114 and 116.

At block 114, the vehicle brake actuator control unit 30 actuates the vehicle brake actuator unit 32 by the requested actuator displacement, which in turn actuates the vehicle braking unit 36 to provide the requested clamp force value, as discussed above. After block 114, the method 100 proceeds to block 112, as will be discussed in greater detail below.

At block 116, the vehicle controller 14 determines a second expected clamp force. The second expected clamp force is determined using the mechanical characteristic function 56. In an exemplary embodiment, to determine the second expected clamp force, the vehicle controller 14 evaluates the mechanical characteristic function 56 at the requested actuator displacement determined at block 110 to calculate the second expected clamp force. After block 116, the method 100 proceeds to block 112.

At block 112, the vehicle controller 14 uses the vehicle brake clamp force sensor 38 to measure the measured clamp force value produced by the vehicle braking unit 36 in response to the actuation at block 114. After block 112, the method 100 proceeds to blocks 118 and 120.

At block 118, the vehicle controller 14 determines a first clamp force deviation between the first expected clamp force determined at block 108 and the measured clamp force value measured at block 112. In an exemplary embodiment, the first clamp force deviation is defined as the absolute value of the difference between the first expected clamp force and the measured clamp force value. If the first clamp force deviation is less than a first predetermined threshold (e.g., five hundred Newtons, five percent of the requested clamp force value, and/or the like), the method 100 proceeds enter a standby state at block 122. If the first clamp force deviation is greater than or equal to the first predetermined threshold, the method 100 proceeds to block 124.

At block 124, the vehicle controller 14 increments an end-to-end diagnostic maturation counter in response to determining that the magnitude of the first clamp force deviation is greater than or equal to the first predetermined threshold. In the scope of the present disclosure, the end-to-end diagnostic maturation counter is a counting variable stored in the media 22 of the vehicle controller 14. In an exemplary embodiment, at block 124, the vehicle controller 14 increases a value of the end-to-end diagnostic maturation counter by one. After block 124, the method 100 proceeds to block 126, as will be discussed in greater detail below.

At block 120, the vehicle controller 14 determines a second clamp force deviation between the second expected clamp force determined at block 116 and the measured clamp force value measured at block 112. In an exemplary embodiment, the second clamp force deviation is defined as the absolute value of the difference between the second expected clamp force and the measured clamp force value. If the second clamp force deviation is less than a second predetermined threshold (e.g., five hundred Newtons, five percent of the requested clamp force value, and/or the like), the method 100 proceeds enter the standby state at block 122. If the second clamp force deviation is greater than or equal to the second predetermined threshold, the method 100 proceeds to block 128. It should be understood that the second predetermined threshold may be the same as or different than the first predetermined threshold without departing from the scope of the present disclosure.

At block 128, the vehicle controller 14 increments a mechanical diagnostic maturation counter in response to determining that the magnitude of the second clamp force deviation is greater than or equal to the second predetermined threshold. In the scope of the present disclosure, the mechanical diagnostic maturation counter is a counting variable stored in the media 22 of the vehicle controller 14. In an exemplary embodiment, at block 128, the vehicle controller 14 increases a value of the mechanical diagnostic maturation counter by one. After block 128, the method 100 proceeds to block 126.

At block 126, the vehicle controller 14 compares the end-to-end diagnostic maturation counter to an end-to-end maturation threshold. Furthermore, the vehicle controller 14 compares the mechanical diagnostic maturation counter to a mechanical maturation threshold. In an exemplary embodiment, the mechanical maturation threshold is less than the end-to-end maturation threshold. By setting the mechanical maturation threshold less than the end-to-end maturation threshold, the system 10 and method 100 are more sensitive to mechanical faults in the vehicle brake-by-wire unit 18.

If the end-to-end diagnostic maturation counter is not greater than or equal to the end-to-end maturation threshold AND the mechanical diagnostic maturation counter is not greater than or equal to the mechanical maturation threshold, the method 100 proceeds to enter the standby state at block 122. If the end-to-end diagnostic maturation counter is greater than or equal to the end-to-end maturation threshold OR the mechanical diagnostic maturation counter is greater than or equal to the mechanical maturation threshold, the method 100 proceeds to block 130.

At block 130, the vehicle controller 14 performs a diagnostic action. In an exemplary embodiment, the diagnostic action includes providing a diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold. In the scope of the present disclosure, the DTC is an alphanumeric code which represents a specific fault or malfunction within one or more systems of the vehicle 12. In an exemplary embodiment, the DTC contains information identifying a type, severity, and/or duration of the fault.

In a non-limiting example, the DTC identifies whether the fault is due to the end-to-end maturation counter exceeding the end-to-end maturation threshold or due to the mechanical diagnostic maturation counter exceeding the mechanical maturation threshold. In an exemplary embodiment, the DTC is stored in a predetermined register or location within the media 22 of the vehicle controller 14. In another exemplary embodiment, the DTC is transferred to another system or module of the vehicle 12, such as, for example, an onboard diagnostic (OBD) module.

In an exemplary embodiment, in response to identifying the DTC in the predetermined register or location within the media 22 of the vehicle controller 14 or the OBD module, the vehicle controller 14 takes further action based on the DTC. In a non-limiting example, the further action includes, for example, displaying a warning text, icon, light, or other indicator to an occupant of the vehicle 12, limiting/adjusting vehicle performance (e.g., a maximum speed), and/or stopping/disabling the vehicle 12. Furthermore, the DTC may be retrieved from the vehicle controller 14 and/or the OBD module by a service technician via an electrical connector configured for transfer of diagnostic information (e.g., an OBD-II port). The service technician may use the DTC and/or associated diagnostic information to troubleshoot, diagnose, repair, and/or replace components of the vehicle 12, including, for example, the vehicle drive-by-wire unit 18 or components thereof. After block 130, the method 100 proceeds to enter the standby state at block 122.

In an exemplary embodiment, the vehicle controller 14 repeatedly exits the standby state 122 and restarts the method 100 at block 102. In a non-limiting example, the vehicle controller 14 exits the standby state 122 and restarts the method 100 on a timer, for example, every three hundred milliseconds.

Figure 5:
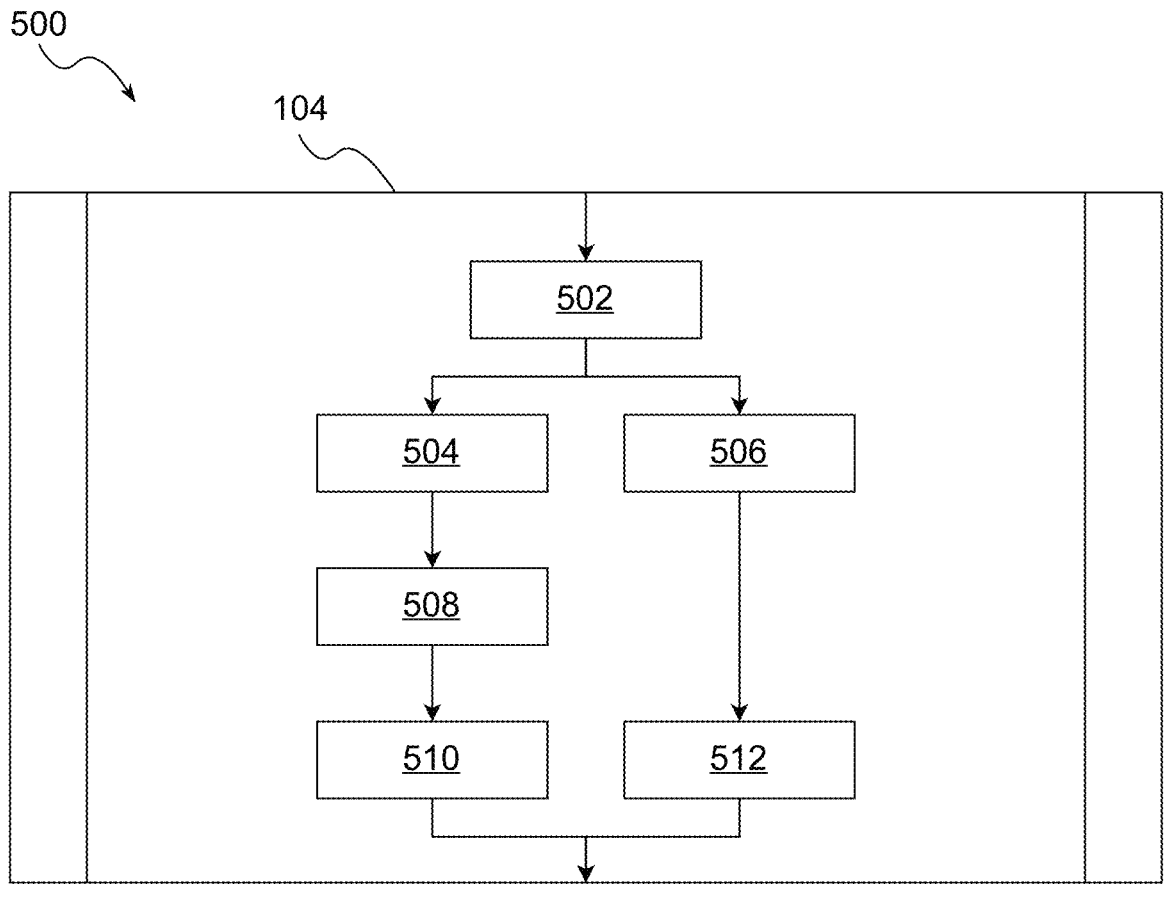
FIG. 5 is a flowchart of a method for determining the characteristic functions of the vehicle brake-by-wire unit, according to an exemplary embodiment.

Referring to FIG. 5, a flowchart of an exemplary embodiment 500 of block 104 (i.e., a method for determining the characteristic functions 50 (FIG. 4) which model nominal overall system dynamics of the vehicle brake-by-wire unit 18) is shown. The exemplary embodiment 500 of block 104 is performed using the reference controller 14' and the reference brake-by-wire unit 18' of the reference calibration system 40. The exemplary embodiment 500 of block 104 begins at block 502. At block 502, the reference controller 14' records a reference excitation profile of the reference brake-by-wire unit 18'. In an exemplary embodiment, to record the reference excitation profile, the reference controller 14' provides the reference brake-by-wire unit 18' with a requested clamp force versus time curve. The reference controller 14' then measures a requested actuator displacement versus time curve with the reference brake actuator displacement sensor 34' and a measured clamp force versus time curve with the reference brake clamp force sensor 38' while the reference brake-by-wire unit 18' is excited with the requested clamp force versus time curve.

In a non-limiting example, the requested clamp force versus time curve includes a step function, a square wave, a sinusoidal wave, a sawtooth wave, a triangle wave, and/or a non-periodic or arbitrary wave intended to mimic typical brake actuation behavior. In the scope of the present disclosure, the reference excitation profile includes both the input waveform (i.e., the requested clamp force versus time curve) and the output waveforms (i.e., the requested actuator displacement versus time curve and the measured clamp force versus time curve). In an exemplary embodiment, the reference excitation profile is saved in the reference media 22' of the reference controller 14'. After block 502, the exemplary embodiment 500 of block 104 proceeds to blocks 504 and 506.

At block 504, the reference controller 14' determines a general form of the end-to-end characteristic transfer function 52 which models the overall system dynamics of the reference brake-by-wire unit 18' and thus the nominal overall system dynamics of the vehicle brake-by-wire unit 18. The general form is characterized by a plurality of end-to-end system parameters. In an exemplary embodiment, the general form of the end-to-end characteristic transfer function 52 is a rational fractional polynomial:

$$H_{end-end} = \frac{b_0 s^m + b_1 s^{m-1} + \cdots + b_m}{s^n + a_1 s^{n-1} + \cdots a_n} \cdot e^{-T_d s} \tag{3}$$

where $H_{end-end}$ is the end-to-end characteristic transfer function 52, s is a complex frequency variable, and the m, n, b, a, and $T_d$ factors are the plurality of end-to-end system parameters. In an exemplary embodiment, the reference controller 14' determines the general form of the end-to-end characteristic transfer function 52 based on analysis of the reference excitation profile recorded at block 502. In another exemplary embodiment, the general form of the end-to-end characteristic transfer function 52 is predetermined and saved in the reference media 22'. It should be understood that additional forms of the end-to-end characteristic transfer function 52, including, for example, multiple input multiple output (MIMO) forms are also within the scope of the present disclosure. After block 504, the exemplary embodiment 500 of block 104 proceeds to block 508.

At block 508, the reference controller 14' estimates a preliminary value for each of the plurality of end-to-end system parameters. In an exemplary embodiment, the reference controller 14' uses a least-squares regression based at least in part on the requested clamp force versus time curve and the measured clamp force versus time curve of the reference excitation profile recorded at block 502. In a non-limiting example, a linear least-squares regression is used, with an estimate vector:

$$\theta = \left(\Phi^T \Phi\right)^{-1} \Phi^T Y \tag{4}$$

where $\theta$ is the estimate vector, $\Phi$ is a regressor matrix, and Y is an output vector. After block 508, the exemplary embodiment 500 of block 104 proceeds to block 510.

At block 510, the reference controller 14' estimates a final value for each of the plurality of end-to-end system parameters. In an exemplary embodiment, the reference controller 14' uses a nonlinear optimization based at least in part on the preliminary value for each of the plurality of end-to-end system parameters determined at block 508, the requested clamp force versus time, and the measured clamp force versus time of the reference excitation profile recorded at block 502. In an exemplary embodiment, the nonlinear optimization includes perturbing one or more of the preliminary values for each of the plurality of end-to-end system parameters, effectively perturbing one or more of the zero and/or pole locations of the end-to-end characteristic transfer function 52, in order to determine optimal values for each of the plurality of end-to-end system parameters. In a non-limiting example, an optimization method such as, for example, sequential quadratic programming (SQP) is used. In an exemplary embodiment, the Ta factor, which is a delay value, is determined by iterating through different delay values within a predetermined range until an optimal delay value is identified. It should be understood that the use of additional parameter estimation algorithms, such as, for example, expectation-maximization, maximum likelihood estimation, Bayesian estimation, method of moments, least-squares, and/or maximum a posteriori is also within the scope of the present disclosure.

After determination of the final value for each of the plurality of end-to-end system parameters, the end-to-end characteristic transfer function 52 is found by substituting the final value for each of the plurality of end-to-end system parameters into the general form of the end-to-end charac-teristic transfer function 52 determined at block 504 (Equation 3). Thus, at block 510, the end-to-end characteristic transfer function 52 is fully defined, and is transferred to the media 22 of the vehicle controller 14 for use in the method 100 as discussed above. After block 510, the exemplary embodiment 500 of block 104 is concluded, and the method 100 proceeds as discussed above.

At block 506, the reference controller 14' determines a general form of the mechanical characteristic function 56 which models the mechanical dynamics of the reference brake-by-wire unit 18' and thus the nominal mechanical dynamics of the vehicle brake-by-wire unit 18. The general form is characterized by a plurality of mechanical system parameters. In an exemplary embodiment, the general form of the mechanical characteristic function 56 is a third-order polynomial:

$$F_{CM}(D_R) = C_1 D_R + C_2 D_R^2 + C_3 D_R^3 \qquad (5)$$

where $F_{CM}(D_R)$ is the mechanical characteristic function 56, $D_R$ is the requested actuator displacement value, and the $C_1$, $C_2$, and $C_3$ factors are the plurality of mechanical system parameters. In an exemplary embodiment, the reference controller 14' determines the general form of the mechanical characteristic function 56 based on analysis of the reference excitation profile recorded at block 502. In another exem-plary embodiment, the general form of the mechanical characteristic function 56 is predetermined and saved in the reference media 22'. It should be understood that additional forms of the mechanical characteristic function 56, includ-ing, for example, higher order polynomials, rational func-tions, logarithmic functions, exponential functions, and/or the like are also within the scope of the present disclosure. After block 506, the exemplary embodiment 500 of block 104 proceeds to block 512.

At block 512, the reference controller 14' estimates a value for each of the plurality of mechanical system param-eters. In an exemplary embodiment, the reference controller 14' uses a polynomial regression (e.g., a cubic regression) such as, for example, a nonlinear least-squares regression, to estimates the value for each of the plurality of mechanical system. In a non-limiting example, the value for each of the plurality of mechanical system parameters is determined such as to fit the third-order polynomial in Equation 5 to a measured clamp force versus requested actuator displacement curve generated based on the reference excitation profile recorded at block 502. It should be understood that the use of additional parameter estimation algorithms, such as, for example, expectation-maximization, maximum like-lihood estimation, Bayesian estimation, method of moments, least-squares, and/or maximum a posteriori is also within the scope of the present disclosure.

After determination of the value for each of the plurality of mechanical system parameters, the mechanical charac-teristic function 56 is found by substituting the value for each of the plurality of mechanical system parameters into the general form of the mechanical characteristic function 56 determined at block 506 (Equation 5). Thus, at block 512, the mechanical characteristic function 56 is fully defined, and is transferred to the media 22 of the vehicle controller 14 for use in the method 100 as discussed above. After block 512, the exemplary embodiment 500 of block 104 is con-cluded, and the method 100 proceeds as discussed above.

The systems 10, 40 and method 100 of the present disclosure offer several advantages. By analyzing the known healthy reference brake-by-wire unit 18' to determine the characteristic functions 50, mathematical models which model nominal operation of the vehicle brake-by-wire unit 18 are generated. By comparing the operation of the vehicle brake-by-wire unit 18 to predictions of the characteristic functions 50 faults are identified. Separate evaluation of the end-to-end characteristic transfer function 52 and the mechanical characteristic function 56 allows for identifica-tion of fault cause. More particularly, mechanical faults in the vehicle brake-by-wire unit 18 are identified quickly, even if the mechanical faults are not severe enough to affect overall operation of the vehicle brake-by-wire unit 18.

The description of the present disclosure is merely exem-plary in nature and variations that do not depart from the gist of the present disclosure are intended to be within the scope of the present disclosure. Such variations are not to be regarded as a departure from the spirit and scope of the present disclosure.

What is claimed is:

1. A method for diagnostic monitoring of a vehicle brake-by-wire system for a vehicle, the method comprising:
   recording a reference excitation profile of a reference brake-by-wire unit, wherein recording the reference excitation profile of the reference brake-by-wire unit further comprises:
      recording the reference excitation profile of the refer-ence brake-by-wire unit, wherein the reference brake-by-wire unit is a known healthy brake-by-wire unit, and wherein the reference excitation profile includes a requested clamp force versus time, a corresponding requested actuator displacement ver-sus time, and a measured clamp force versus time;
   identifying one or more characteristic functions of the reference brake-by-wire unit based at least in part on the reference excitation profile;
   determining a performance of a vehicle brake-by-wire unit based at least in part on the one or more charac-teristic functions;
   performing a diagnostic action based at least in part on the performance of the vehicle brake-by-wire unit; and
   adjusting a maximum speed of the vehicle based at least in part on the diagnostic action.

2. The method of claim 1, wherein identifying the one or more characteristic functions further comprises:

determining an end-to-end characteristic transfer function based at least in part on the requested clamp force versus time and the measured clamp force versus time; and determining a mechanical characteristic function based at least in part on the requested actuator displacement versus time and the measured clamp force versus time.

3. The method of claim 2, wherein determining the end-to-end characteristic transfer function further comprises:

determining a general form of the end-to-end characteristic transfer function, wherein the general form of the end-to-end characteristic transfer function models nominal overall system dynamics of the vehicle brake-by-wire unit, and wherein the general form of the end-to-end characteristic transfer function is characterized by a plurality of end-to-end system parameters; and estimating a value for each of the plurality of end-to-end system parameters based at least in part on the requested clamp force versus time and the measured clamp force versus time.

4. The method of claim 3, wherein determining the general form of the end-to-end characteristic transfer function further comprises:

determining the general form of the end-to-end characteristic transfer function to be a rational fractional polynomial:

$$H_{end-end} = \frac{b_0 s^m + b_1 s^{m-1} + \cdots + b_m}{s^n + a_1 s^{n-1} + \cdots a_n} \cdot e^{-T_d s}$$

wherein $H_{end-end}$ is the end-to-end characteristic transfer function, s is a complex frequency variable, and the m, n, b, a, and $T_d$ factors are the plurality of end-to-end system parameters.

5. The method of claim 3, wherein estimating the value for each of the plurality of end-to-end system parameters further comprises:

estimating a preliminary value for each of the plurality of end-to-end system parameters using a least-squares regression based at least in part on the requested clamp force versus time and the measured clamp force versus time; and estimating the value for each of the plurality of end-to-end system parameters using a nonlinear optimization based at least in part on the preliminary value for each of the plurality of end-to-end system parameters, the requested clamp force versus time, and the measured clamp force versus time.

6. The method of claim 2, wherein determining the mechanical characteristic function further comprises:

determining a general form of the mechanical characteristic function, wherein the general form of the mechanical characteristic function models nominal mechanical dynamics of the vehicle brake-by-wire unit, wherein the general form of the mechanical characteristic function is a third-order polynomial, and wherein the general form of the mechanical characteristic function is characterized by a plurality of mechanical system parameters; and estimating a value for each of the plurality of mechanical system parameters based at least in part on the requested actuator displacement versus time and the measured clamp force versus time.

7. The method of claim 6, wherein estimating the value for each of the plurality of mechanical system parameters further comprises:

estimating the value for each of the plurality of mechanical system parameters using a nonlinear least-squares regression based at least in part on the requested actuator displacement versus time and the measured clamp force versus time.

8. The method of claim 2, wherein determining the performance of the vehicle brake-by-wire unit further comprises:

determining a first expected clamp force based at least in part on a requested clamp force value and the end-to-end characteristic transfer function;

determining a second expected clamp force based at least in part on an actuator displacement value and the mechanical characteristic function;

determining a first clamp force deviation between the first expected clamp force and a measured clamp force value;

determining a second clamp force deviation between the second expected clamp force and the measured clamp force value; and determining the performance of the vehicle brake-by-wire unit based at least in part on the first clamp force deviation and the second clamp force deviation.

9. The method of claim 8, wherein performing the diagnostic action further comprises:

incrementing an end-to-end diagnostic maturation counter in response to determining that a magnitude of the first clamp force deviation is greater than or equal to a first predetermined threshold;

incrementing a mechanical diagnostic maturation counter in response to determining that a magnitude of the second clamp force deviation is greater than or equal to a second predetermined threshold;

comparing the end-to-end diagnostic maturation counter to an end-to-end maturation threshold;

comparing the mechanical diagnostic maturation counter to a mechanical maturation threshold, wherein the mechanical maturation threshold is less than the end-to-end maturation threshold; and providing a diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold.

10. The method of claim 9, wherein performing the diagnostic action further comprises:

displaying a warning indicator to an occupant of the vehicle in response to determining that the end-to-end diagnostic maturation counter is greater than or equal to the end-to-end maturation threshold OR that the mechanical diagnostic maturation counter is greater than or equal to the mechanical maturation threshold.

11. A vehicle brake-by-wire diagnostic system, the vehicle brake-by-wire diagnostic system comprising:

a vehicle brake-by-wire unit having a vehicle brake clamp force sensor;

a vehicle controller in electrical communication with the vehicle brake-by-wire unit, wherein the vehicle controller is programmed to:

determine a first expected clamp force based at least in part on a requested clamp force value and an end-to-end characteristic transfer function, wherein the end-to-end characteristic transfer function models nominal overall system dynamics of the vehicle brake-by-wire unit;

determine a second expected clamp force based at least in part on an actuator displacement value and a mechanical characteristic function, wherein the mechanical characteristic function models nominal mechanical dynamics of the vehicle brake-by-wire unit;

determine a first clamp force deviation between the first expected clamp force and a measured clamp force value measured by the vehicle brake clamp force sensor;

determine a second clamp force deviation between the second expected clamp force and the measured clamp force value measured by the vehicle brake clamp force sensor;

determine a performance of the vehicle brake-by-wire unit based at least in part on the first clamp force deviation and the second clamp force deviation; and perform a diagnostic action based at least in part on the performance of the vehicle brake-by-wire unit, wherein the diagnostic action includes limiting a maximum speed of the vehicle in response to identifying a diagnostic trouble code (DTC).

12. The vehicle brake-by-wire diagnostic system of claim 11, further comprising a reference brake-by-wire unit having a reference brake clamp force sensor and a reference brake actuator displacement sensor, and further comprising a reference controller in electrical communication with the reference brake-by-wire unit, wherein the reference controller is programmed to:

record a reference excitation profile of the reference brake-by-wire unit, wherein the reference brake-by-wire unit is a known healthy brake-by-wire unit, and wherein the reference excitation profile includes a requested clamp force versus time, a corresponding requested actuator displacement versus time, and a measured clamp force versus time;

determine the end-to-end characteristic transfer function based at least in part on the requested clamp force versus time and the measured clamp force versus time; and determine the mechanical characteristic function based at least in part on the requested actuator displacement versus time and the measured clamp force versus time.

13. The vehicle brake-by-wire diagnostic system of claim 12, wherein to determine the end-to-end characteristic transfer function, the reference controller is further programmed to:

determine a general form of the end-to-end characteristic transfer function to be a rational fractional polynomial:

$$H_{end-end} = \frac{b_0 s^m + b_1 s^{m-1} + \cdots + b_m}{s^n + a_1 s^{n-1} + \cdots a_n} \cdot e^{-T_d s}$$

wherein $H_{end-end}$ is the end-to-end characteristic transfer function, s is a complex frequency variable, and the m, n, b, a, and $T_d$ factors are a plurality of end-to-end system parameters, and wherein the general form of the end-to-end characteristic transfer function models nominal overall system dynamics of the vehicle brake-by-wire unit; and estimate a value for each of the plurality of end-to-end system parameters based at least in part on the requested clamp force versus time and the measured clamp force versus time.

14. The vehicle brake-by-wire diagnostic system of claim 13, wherein to estimate the value for each of the plurality of end-to-end system parameters, the reference controller is further programmed to:

estimate a preliminary value for each of the plurality of end-to-end system parameters using a least-squares regression based at least in part on the requested clamp force versus time and the measured clamp force versus time; and estimate the value for each of the plurality of end-to-end system parameters using a nonlinear optimization based at least in part on the preliminary value for each of the plurality of end-to-end system parameters, the requested clamp force versus time, and the measured clamp force versus time.

15. The vehicle brake-by-wire diagnostic system of claim 14, wherein to determine the mechanical characteristic function, the reference controller is further programmed to:

determine a general form of the mechanical characteristic function, wherein the general form of the mechanical characteristic function models nominal mechanical dynamics of the vehicle brake-by-wire unit, wherein the general form of the mechanical characteristic function is a third-order polynomial, and wherein the general form of the mechanical characteristic function is characterized by a plurality of mechanical system parameters; and estimate a value for each of the plurality of mechanical system parameters based at least in part on the requested actuator displacement versus time and the measured clamp force versus time.

16. The vehicle brake-by-wire diagnostic system of claim 15, wherein to estimate the value for each of the plurality of mechanical system parameters, the reference controller is further programmed to:

estimate the value for each of the plurality of mechanical system parameters using a nonlinear least-squares regression based at least in part on the requested actuator displacement versus time and the measured clamp force versus time.

17. The vehicle brake-by-wire diagnostic system of claim 11, wherein to perform the diagnostic action, the vehicle controller is further programmed to:

increment an end-to-end diagnostic maturation counter in response to determining that a magnitude of the first clamp force deviation is greater than or equal to a first predetermined threshold;

increment a mechanical diagnostic maturation counter in response to determining that a magnitude of the second clamp force deviation is greater than or equal to a second predetermined threshold;

compare the end-to-end diagnostic maturation counter to an end-to-end maturation threshold;

compare the mechanical diagnostic maturation counter to a mechanical maturation threshold, wherein the mechanical maturation threshold is less than the end-to-end maturation threshold; and provide the diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold.

18. A method for diagnostic monitoring of a vehicle brake-by-wire system, the method comprising:

recording a reference excitation profile of a reference brake-by-wire unit, wherein the reference brake-bywire unit is a known healthy brake-by-wire unit, and wherein the reference excitation profile includes a requested clamp force versus time, a corresponding requested actuator displacement versus time, and a measured clamp force versus time;

determining an end-to-end characteristic transfer function based at least in part on the requested clamp force versus time and the measured clamp force versus time;

determining a mechanical characteristic function based at least in part on the requested actuator displacement versus time and the measured clamp force versus time;

determining a performance of a vehicle brake-by-wire unit based on the end-to-end characteristic transfer function and the mechanical characteristic function;

performing a diagnostic action based at least in part on the performance of the vehicle brake-by-wire unit, wherein the diagnostic action includes providing a diagnostic trouble code (DTC) based at least in part on the performance of the vehicle brake-by-wire unit; and limiting a maximum speed of the vehicle based at least in part on the DTC.

19. The method of claim 18, wherein determining the end-to-end characteristic transfer function and the mechanical characteristic function further comprises:

determining a general form of the end-to-end characteristic transfer function to be a rational fractional polynomial:

$$H_{end-end} = \frac{b_0 s^m + b_1 s^{m-1} + \cdots + b_m}{s^n + a_1 s^{n-1} + \cdots a_n} \cdot e^{-T_d s}$$

wherein $H_{end-end}$ is the end-to-end characteristic transfer function, s is a complex frequency variable, and the m, n, b, a, and $T_d$ factors are a plurality of end-to-end system parameters;

estimating a value for each of the plurality of end-to-end system parameters based at least in part on the requested clamp force versus time and the measured clamp force versus time;

determining a general form of the mechanical characteristic function, wherein the general form of the mechanical characteristic function models nominal mechanical dynamics of the vehicle brake-by-wire unit, wherein the general form of the mechanical characteristic function is a third-order polynomial, and wherein the general form of the mechanical characteristic function is characterized by a plurality of mechanical system parameters; and estimating a value for each of the plurality of mechanical system parameters based at least in part on the requested actuator displacement versus time and the measured clamp force versus time.

20. The method of claim 19, wherein determining the performance of the vehicle brake-by-wire unit and performing the diagnostic action further comprises:

determining a first expected clamp force based at least in part on a requested clamp force value and the end-to-end characteristic transfer function;

determining a second expected clamp force based at least in part on an actuator displacement value and the mechanical characteristic function;

determining a first clamp force deviation between the first expected clamp force and a measured clamp force value;

determining a second clamp force deviation between the second expected clamp force and the measured clamp force value; and determining the performance of the vehicle brake-by-wire unit based at least in part on the first clamp force deviation and the second clamp force deviation;

incrementing an end-to-end diagnostic maturation counter in response to determining that a magnitude of the first clamp force deviation is greater than or equal to a first predetermined threshold;

incrementing a mechanical diagnostic maturation counter in response to determining that a magnitude of the second clamp force deviation is greater than or equal to a second predetermined threshold;

comparing the end-to-end diagnostic maturation counter to an end-to-end maturation threshold;

comparing the mechanical diagnostic maturation counter to a mechanical maturation threshold, wherein the mechanical maturation threshold is less than the end-to-end maturation threshold; and providing the diagnostic trouble code (DTC) in response to determining that the end-to-end diagnostic maturation counter is greater than or equal to the end-to-end maturation threshold OR that the mechanical diagnostic maturation counter is greater than or equal to the mechanical maturation threshold.

* * * * *